310-13 SR

FIP8502 OR 3,735,163

United States Patent [19]

Dijkstra et al.

[11] 3,735,163

[45] May 22, 1973

[54] LINEAR MOTOR FOR THE POSITIONING OF MAGNETIC HEADS

[75] Inventors: Durk Dijkstra, Rijswijk; Willem Van Der Hoek, Eindhoven, Emmasingel; Wim Visser, Rijswijk, all of Netherlands

[73] Assignee: U.S. Philips Corporation, New York, N.Y.

[22] Filed: May 1, 1972

[21] Appl. No.: 249,315

[30] Foreign Application Priority Data

May 6, 1971 Netherlands ........................7106185

[52] U.S. Cl. ..............................310/13, 340/174.1 C

[51] Int. Cl. ..............................................H02k 41/02

[58] Field of Search .............310/12–14; 390/174.1 C

[56] References Cited

UNITED STATES PATENTS 3,656,015 4/1972 Gillum ...................................310/13

3,666,977 5/1972 Helms et al ............................310/13

3,659,124 4/1972 Lathrop .................................310/13

3,505,544 4/1970 Helms ...................................310/13

3,577,023 5/1971 Bleiman ................................310/13

*Primary Examiner*—D. F. Duggan

*Attorney*—Frank R. Trifari and Robert S. Salzman

[57] ABSTRACT

A device for positioning magnetic heads for use in a disk store, which device includes a carriage which is provided with rollers and is displaceable on fixed guide tracks. The carriage has the form of a sectional beam which has at least two parallel outer surfaces and on one end of which a coil is wound. When the coil is energized the carriage is movable with respect to a magnet system. On the other end of the beam, there is secured a mounting column to which a plurality of parallel supporting arms carrying magnetic heads are secured. The rollers are mounted at two spaced locations on the two outer surfaces in a manner such that the rotation axes of the rollers are inclined to these surfaces. The guide tracks extend parallel to the two outer surfaces and provide dimensional stability to the beam which is supported at four points.

7 Claims, 7 Drawing Figures

Patented May 22, 1973

3,735,163

4 Sheets-Sheet 2

LINEAR MOTOR FOR THE POSITIONING OF MAGNETIC HEADS

Figure 1:
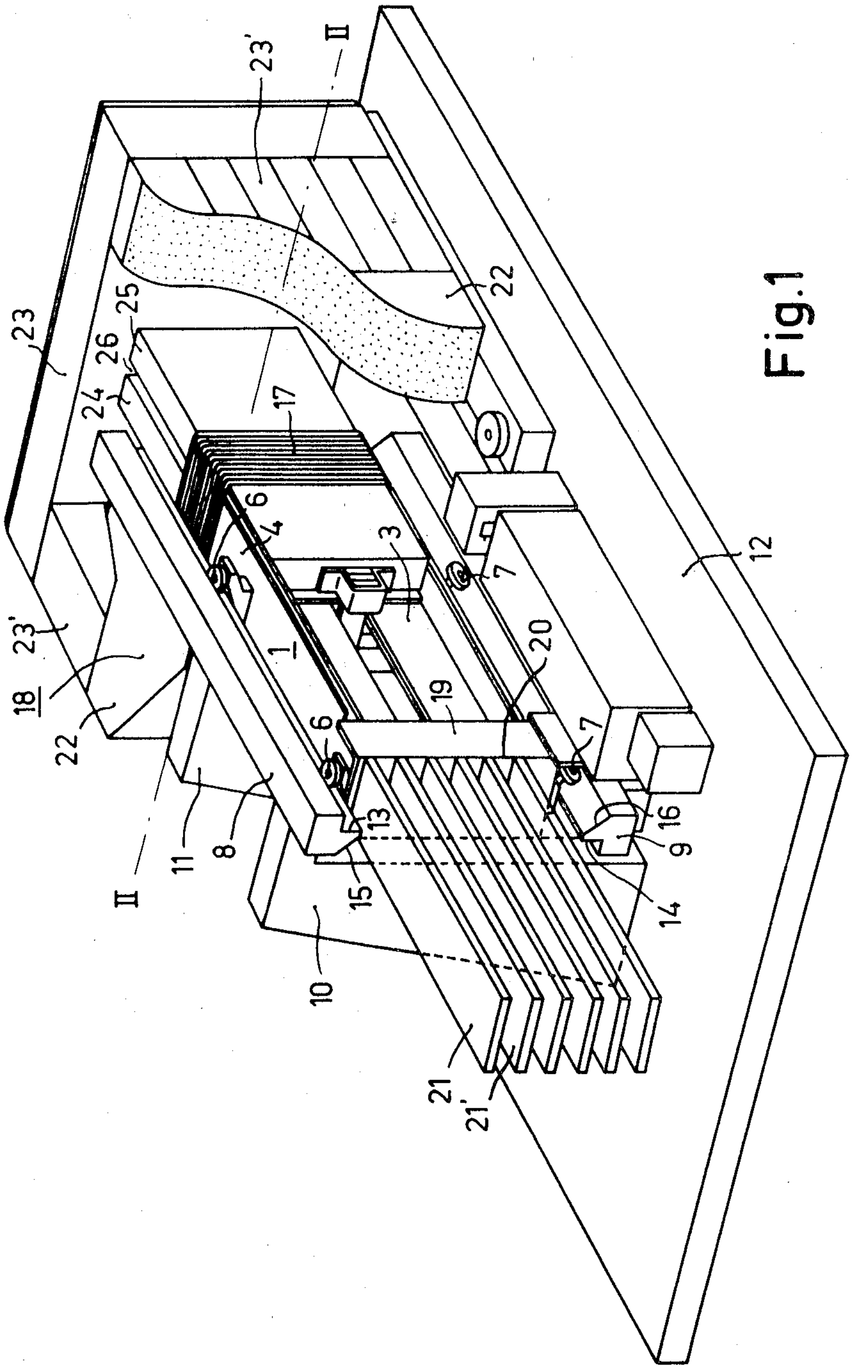

The invention relates to a driving device for the linear positioning of magnetic heads in an apparatus for processing data in the form of magnetic recordings on disk-shaped recording surfaces. The driving device comprises a carriage structure on which rollers are mounted by means of which the carriage is displaceable on fixed guide tracks, and a coil which is wound on the carriage structure and when energized is movable with respect to a magnet system supported by a base plate and by means of which the carriage is displaceable. The carriage structure is provided with a mounting column which has a mounting surface which extends at right angles to the direction of displacement of the carriage and to which is secured a plurality of mutually parallel supporting arms which carry the magnetic heads.

In such driving devices it is required that when the carriage is displaced for the positioning of the magnetic heads with respect to the recording disks, the mounting surface to which the supporting arms carrying the magnetic heads are secured, is displaced truly parallel to itself, and is not rotated with respect to an axis which extends in the travelling direction. To satisfy this requirement, in the known driving devices the carriage and the mounting column arranged on it are made rigid and heavy to ensure that the position of the mounting surface, once set, is retained. Such rigid carriage structures have considerable weight, which has the disadvantage that in the positioning of the magnetic heads, large accelerating and decelerating forces are produced.

It is an object of the invention to avoid the said disadvantage and to provide a driving device in which the accelerating and decelerating forces produced are considerably reduced.

For this purpose a driving device according to the invention is characterized in that the carriage structure is constituted by a sectional beam which has at least two parallel outer surfaces. On one end of the beam the coil is wound substantially in the form of a rectangle and on the other end of the beam the mounting column is secured. Rollers are mounted on the beam outer surfaces, with their rotational axes inclined at an angle to these surfaces, at two locations which, viewed in the direction of length of the beam, are spaced from one another, while the rollers are movable on guide tracks which extend parallel to the outer surfaces.

The arrangement according to the invention provides the advantage that a carriage has a comparatively light weight, yet satisfies the requirement that the mounting surface is displaced parallel to itself and is not rotated with respect to an axis which extends in the travelling direction. In fact, a sectional beam has a bending strength which ensures that the mounting surface is displaced parallel to itself, while rotation of the mounting surface about the longitudinal axis of the beam is precluded by the four-point support of the beam by means of the rollers, the guide tracks providing dimensional stability to the beam.

Although the beam may in principle have various cross-sections, according to the invention the beam preferably is of a substantially I-shaped section which provides a satisfactory dissipation of the heat generated in the coil wound on the I-beam. In another suitable embodiment of the invention the beam is substantially in the form of a sleeve profile having a rectangular cross-section, the two shorter sides of which are each constituted by a solid bar of rectangular cross-section and the two longer sides each are constituted by a plate secured to these bars.

A suitable embodiment of the invention consists of two pairs of rollers mounted for free rotation on the two parallel outer surfaces of the beam. Each roller pair comprises a first roller, the axis of rotation of which is at right angles to the flange, and a second roller which is rotatable about an axis including an acute angle with the first-mentioned axis of rotation.

The material of which the beam is made preferably is aluminum.

In a suitable embodiment of the invention the magnet system has a split core which defines a gap in which the carriage moves. This provides a short length for the construction.

Another embodiment of the invention features the magnet system supported so as to be displaceable with respect to the base plate in the travelling direction of the carriage, and coupled to the base plate by resilient means. In this embodiment the magnet system is preferably provided with guide tracks which are displaceable on rollers rotatably mounted on the base plate, the magnet system and the base plate being coupled to one another by a leaf spring. This arrangement prevents vibrations produced in the assembly comprising the magnet system and the coil, from being transmitted to the recording disks of the data processing apparatus.

Figure 2:
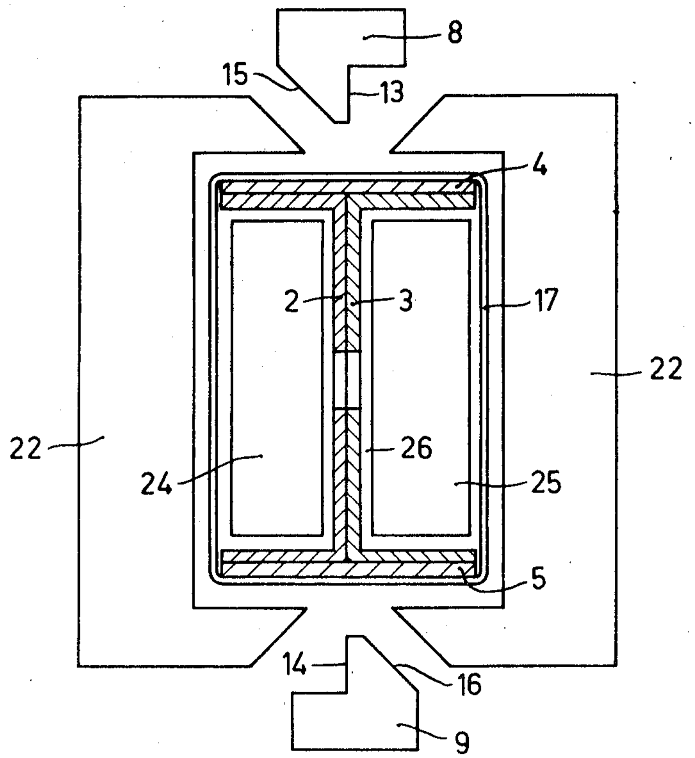
Figure 3:
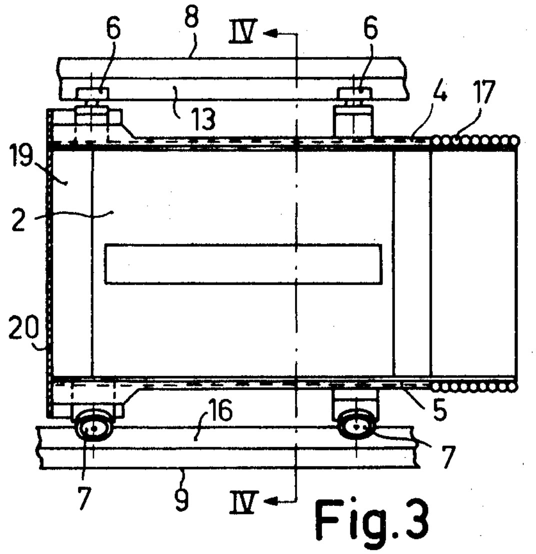
Figure 4:
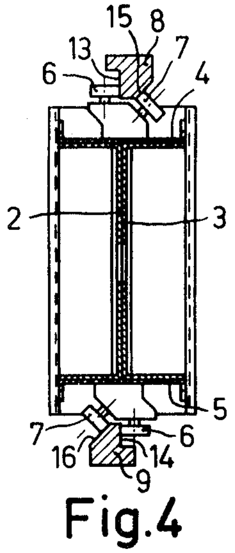
Figure 5:
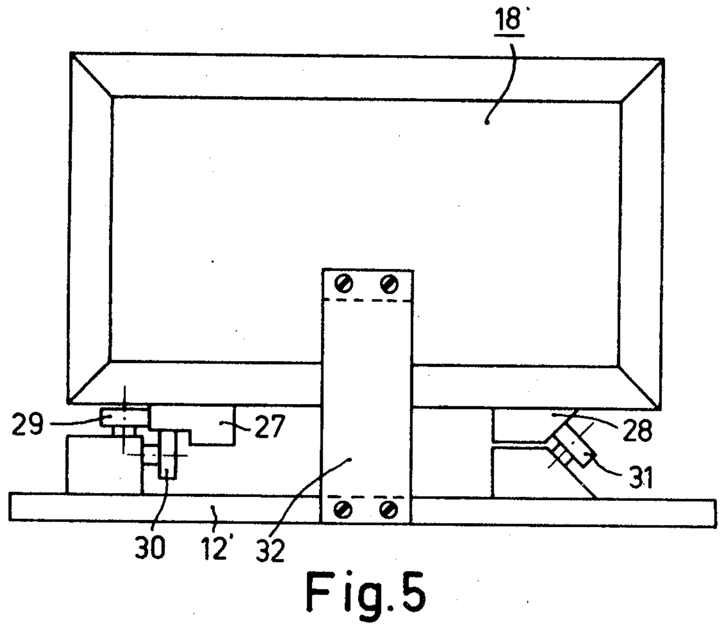
Figure 6:
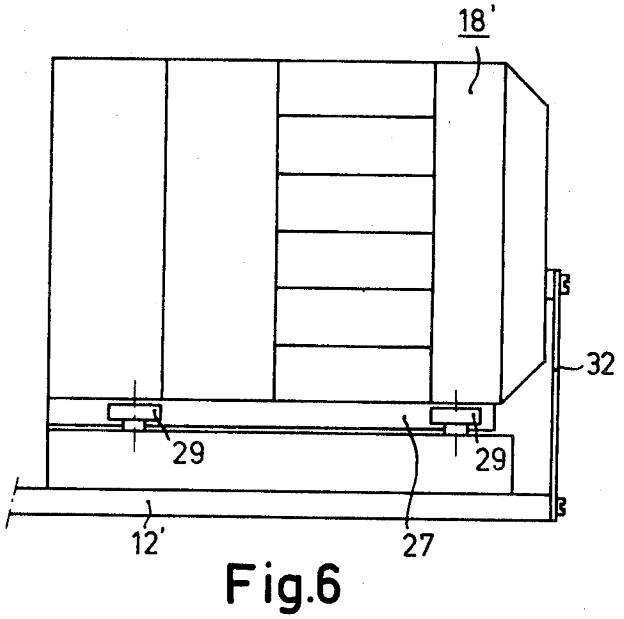
Figure 7:
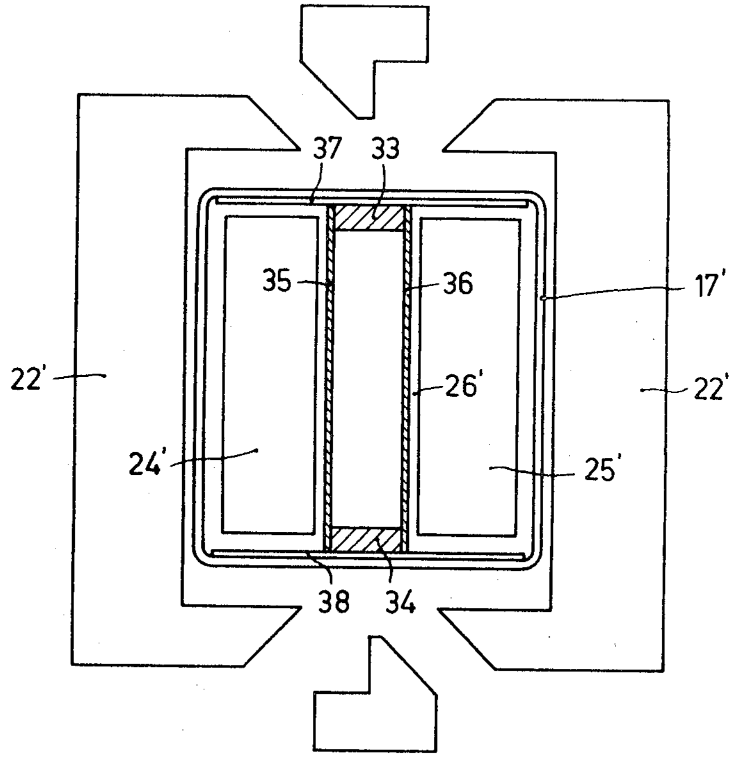

Embodiments of the invention will now be described, by way of example, with reference to the accompanying diagrammatic drawings, in which:

FIG. 1 is a perspective view of a driving device according to the invention,

FIG. 2 is a cross-sectional view of the device on an enlarged scale taken on the line II—II of FIG. 1, FIG. 3 is a side elevation of a carriage structure according to the invention, FIG. 4 is a cross-sectional view of the carriage structure taken on the line IV—IV of FIG. 3, FIG. 5 is a rear elevation of a modified arrangement of the magnet system in a device according to the invention, FIG. 6 is a side elevation of the magnet system shown in FIG. 5, and FIG. 7 is a cross-sectional view, similar to that of FIG. 2, of a modified embodiment of a carriage structure according to the invention.

The driving device according to the invention, is intended to be used in an apparatus for processing data in the form of magnetic recordings on disk-shaped recording surfaces, not shown. The device includes a carriage structure 1 in the form of a sectional beam.

In the embodiment shown in FIGS. 1 to 4 the beam has an I-section which is built up from two identical channels 2 and 3 arranged with their webs adjacent to one another, and two plates 4 and 5 each secured to two aligned flanges of the channels. The components 2, 3, 4 and 5 of the I-beam are made of a light-weight material, preferably aluminum sheet. On the two flanges of the I-beam formed by the plates 4 and 5, at two locations spaced from one another in the direction of length of the beam, a pair of rollers 6, and 7 is mounted. The rotation axis of one roller 6, of each roller pair, is at right angles to the flange, and the rotation axis of the roller 7, is inclined at an acute angle, for example of the order of 45°, to the rotation axis of the roller 6. As will be seen particularly, in the embodiment shown in FIG. 4 the roller pairs mounted on the flange 4, and the roller pairs mounted on the flange 5, are arranged at mirror-image positions relative to a plane containing the web of the I-beam. The carriage, in the form of a beam of special section carrying the rollers, is movable along guide tracks 8 and 9 which extends parallel to the flanges 4 and which 5 are rigidly secured to a base plate 12 by supports 10 and 11. The rollers 6 run on guide tracks surfaces 13 and 14 situated substantially in the plane containing the rib of the I-beam, and the rollers 7 run on inclined guide track faces 15 and 16 arranged at mirror-image positions.

On the rear end of the I-beam there is wound a coil 17 which when energized by means, not shown, is displaceable with respect to a magnet system 18 supported by the base plate 12 and by means of which the carriage can be driven. The coil 17 consequently has a rectangular cross-section, which provides the advantage that unlike known round coils, the coil is comparatively rigid in the direction of length of the beam. Two opposed sides of this rectangular coil contact the flanges of the I-beam, ensuring satisfactory dissipation of the heat generated in the coil.

On the other end of the I-beam remote from the coil, there is secured a mounting column 19 which has a mounting surface 20 which extends at right angles to the travelling direction of the beam and to which a plurality of mutually parallel supporting arms 21, 21', . . . etc., are secured which carry magnetic heads, not shown.

The magnet system 18 is built up of two iron pole pieces 22, elements 23' made of a permanent-magnetic material, a yoke 23, and a split soft-iron core 24, 25 which defines a gap 26 in which the carriage moves FIGS. 1 and 2. In the embodiment shown in FIG. 1 the magnet system is rigidly secured to the base plate. FIGS. 5 and 6 show a modified embodiment in which a magnet system 18' is provided with guide tracks 27 and 28, which are movable on rollers 29, 30 and 31. The rollers are mounted on a base plate 12' so that the magnet system is displaceable in the travelling direction of the carriage with respect to the base plate. The magnet system and the base plate are interconnected by a leaf spring 32. In this modified embodiment, vibrations which occur in the assembly of the coil and the magnet are prevented from being transmitted to the base plate and hence to the recording disks.

FIG. 7 shows a further embodiment of a carriage, according to the invention, which moves in a gap 26' between soft-iron core parts 24' and 25', which together with two pole pieces 22' form part of a magnet system. The carriage substantially has a rectangular sleeve-like profile, the two shorter sides of which are constituted by solid bars 33 and 34, and the two longer sides of which are constituted by plates 35 and 36 secured to these bars. At the location of the coil 17', the sleeve-shaped carriage is provided with two wide supporting plates 37 and 38 for the coil. The components 33 and 38 of the carriage are made of an aluminum base material.

What is claimed is:

1. A driving device for the linear positioning of magnetic heads in an apparatus for processing data in the form of magnetic recordings on disc-shaped recording surfaces, said driving device comprising a carriage on which rollers are mounted, the carriage being displaceable on fixed guide tracks by means of said rollers, and a coil which is wound on the carriage, said coil when energized being movable with respect to a magnet system supported by a base plate and when so energized causes the carriage to be displaced, the carriage structure being provided with a mounting column having a mounting surface which extends at substantially right angles to the direction of displacement of the carriage and to which a plurality of substantially mutually parallel supporting arms are secured which carry the magnetic heads, said carriage being constituted by a sectional beam which has at least two substantially parallel outer surfaces, and on one end of which the coil is wound substantially in the form of a rectangle, the mounting column being secured to another end of said carriage, the rollers being mounted on said two outer surfaces with their rotational axes inclined at an angle to these surfaces at two axially spaced locations on the beam, the rollers being movable on guide tracks which extend substantially parallel to said outer surface, said rollers further comprising two pairs of rollers, each pair having a first roller, an axis of rotation of which is at substantially right angles to the outer surfaces, and a second roller, which is rotatable about an axis forming an acute angle with the first mentioned rotational axis.

2. A driving device as claimed in claim 1, wherein the beam is substantially I-shaped.

3. A driving device as claimed in claim 1, wherein the beam is substantially in the form of a sleeve profile having a rectangular cross-section, two shorter sides of which are each constituted by a solid bar of rectangular cross-section, and two longer sides of which are each constituted by a plate secured to these bars.

4. A driving device as claimed in claim 1, wherein the beam is made of aluminum.

5. A driving device as claimed in claim 1, wherein the magnet system has a split core which defines a gap in which the carriage moves.

6. A driving device as claimed in claim 5, wherein the magnet system is supported so as to be displaceable in a direction of displacement of the carriage with respect to the base plate, the magnet system and the base plate being coupled to one another by resilient means.

7. A driving device as claimed in claim 6, wherein the magnet system is provided with guide tracks which are displaceable on rollers rotatably mounted on the base plate, the magnet system and the base plate being coupled to one another by a leaf spring.

* * * * *